Figure 1:
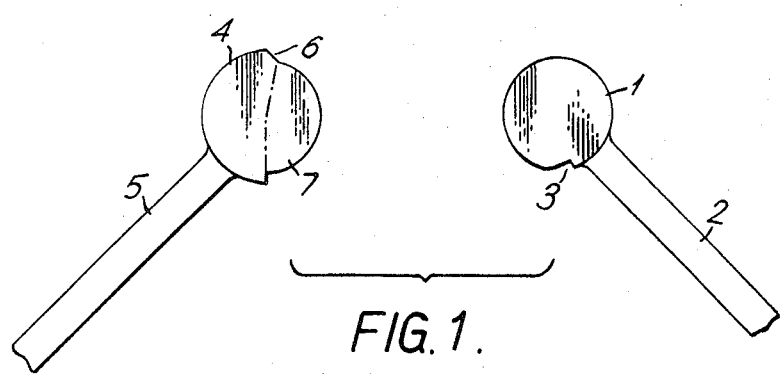

United States Patent
Devas

[15] 3,651,521
[45] Mar. 28, 1972

[54] PROSTHETIC JOINT FOR USE IN THE HUMAN BODY

[72] Inventor: Michael Bertrand Devas, Hastings, England

[73] Assignee: National Research Development Corporation, London, England

[22] Filed: Feb. 5, 1970

[21] Appl. No.: 8,806

[30] Foreign Application Priority Data

Feb. 7, 1969   Great Britain..........................6,803/69

[52] U.S. Cl. .......................................3/1, 128/92 C, 287/14, 287/89, 287/92
[51] Int. Cl. ...............................................A61f 1/24
[58] Field of Search .................3/1; 128/92 R, 92 C; 287/14, 287/89, 92, 101

[56] References Cited

UNITED STATES PATENTS 3,506,982   4/1970   Steffee............................................3/1
2,696,817   12/1954   Prevo....................................128/92 C

FOREIGN PATENTS OR APPLICATIONS 589,033   12/1933   Germany........................................3/1

OTHER PUBLICATIONS

" Metal Alloplasty of The Knee Joint" by E. J. Moeys, The Journal of Bone & Joint Surgery, Vol. 36–4, No. 2, Apr. 1954, pp. 363– 367.
Shiers' Knee Prosthesis (G297) Orthopaedic Calalogue of Down Bros. and Mayer & Phelps, Ltd., page G42, Received May 18, 1966

Primary Examiner—Richard A. Gaudet
Assistant Examiner—Ronald L. Frinks
Attorney—Cushman, Darby & Cushman

[57] ABSTRACT

A prosthetic device comprising mutually engageable male and female components to afford pivotal rotation in a plane, the female component including a socket member having a concave bearing surface with a cross section in said plane substantially in the form of a first circular segment subtending an angle greater than 180°, and a first shaft projecting from the rear of said socket member, and the male component including a head member having a convex bearing surface with a cross section in said plane substantially in the form of a second circular segment of equal radius to said first segment, subtending an angle significantly greater than said first segment, and relieved towards one end over a segmental angle of at least similar order to that by which said first segment exceeds 180°, and a second shaft projecting from the rear of said head member.

9 Claims, 2 Drawing Figures

Patented March 28, 1972 3,651,521

PROSTHETIC JOINT FOR USE IN THE HUMAN BODY

This invention relates to human prosthesis. The invention is particularly concerned with finger joint prosthesis but is applicable also to any other joints moving in a single plane and especially the elbow.

Previous attempts to devise prosthesis for finger joints have been unduly complex. The designs which have been proposed have usually involved screws and clamps and have necessitated removal of the natural joint for the purposes of assembly. Partly for this reason and partly because of the mechanism being blocked by tissue regeneration, previous attempts to devise finger joint prosthesis have failed.

An object of the present invention is to provide a simplified prosthesis suitable for use in finger joints and other joints in the body without duly disturbing existing structures.

According to the present invention, there is provided a prosthetic device comprising mutually engageable male and female components to afford pivotal rotation in a plane, the female component including a socket member having a concave bearing surface with a cross section in said plane substantially in the form of a first circular segment subtending an angle greater than 180°, and a first shaft projecting from the rear of said socket member, and the male component including a head member having a convex bearing surface with a cross section in said plane substantially in the form of a second circular segment of equal radius to said first segment, subtending an angle significantly greater than said first segment, and relieved towards one end over a segmental angle of at least similar order to that by which said first segment exceeds 180°, and a second shaft projecting from the rear of said head member.

The cross-sectional segment of the socket conveniently subtends an angle of up to 10° in excess of 180° when a flexible plastics material is used, although a smaller angle is appropriate when a hard metal or other rigid material is used. The amount by which the cross-sectional segment of the head is relieved will be of at least the same order as that by which the corresponding socket segment exceeds 180°, so that there is a relative angular disposition between the two members whereat the head can be engaged in the socket. Moreover, the head segment is relieved towards one end of its extent so that the angular amount by which the head segment exceeds the socket segment generally represents the range of pivotal movement with the two members engaged. In this last respect, it will normally be sufficient to allow for a range of pivotal movement of about 90° (say 100° at the most) without unlocking of the engaged parts for a finger joint, and so the head segment suitably subtends about 280°.

Considering the dispositions of the shafts relative to the plane of rotation: in a finger joint these will be such that there is an angle of less than 90° between the shafts when the head and socket are first engaged since such joints do not normally assume such an angle but can be made to do so during operation as required for implantation. In other joints, the natural range of movement may be different and the mutual disposition of the prosthetic device shafts can be set accordingly during manufacture. More generally speaking, insertion of the head into the socket, and also removal, will only be possible with the associated shafts in a predetermined limited angular relationship and this will be pre-arranged so that, once the joint is assembled in a patient, the joint cannot be disconnected within the normal working range of the joint. This relationship will normally involve offsetting of the socket shaft in the plane of rotation relative to the central radius of the socket segment, with the head shaft joining the head adjacent the relieved surface thereof.

Preferably, the leading edge of the socket remote from the socket shaft is chamfered towards its bearing surface to avoid or minimize pinching of tissue when the joint is rotated away from its initially engaged disposition.

Figure 2:
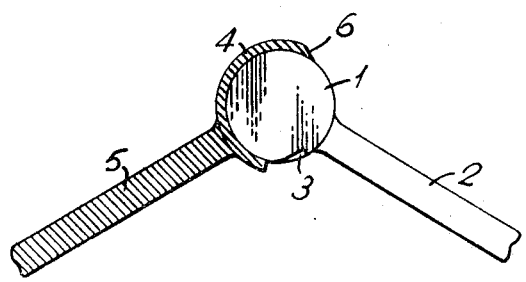

For a fuller understanding of the present invention reference is now made, by way of example, to the accompanying drawings, in which:

FIG. 1 is a side elevation of the separate components of a device according to the invention, and FIG. 2 is a cross section of the same device when assembled.

The illustrated device is intended as a prosthesis for a finger joint. The male component of the device comprises a circular cylindrical head member 1 and a shaft 2, the head and shaft being made in one piece. The bearing surface of the head 1 is relieved at 3 by removal of a small wedge-shaped portion of the head extending from one plane face to the other. The shaft 2 projects radially from the head 1 adjacent the relieved portion 3. The female component of the device comprises a socket member 4 which is part circular cylindrical in shape and, when viewed in cross section, subtends an angle at the center of 190°. The socket 4 is made in one piece with a shaft 5 projecting radially from the rear of the socket and offset towards one longitudinal edge thereof. The other longitudinal edge of the socket is chamfered at 6 towards its bearing surface. The plane sides of the socket 4 are extended at 7 so that when the joint is assembled the plane faces of the head 1 are completely enclosed.

FIG. 1 shows the two components of the joint being offered to each other, and the head 1 can be inserted in the socket 4 with the shafts at a mutual angle of about 45°. FIG. 2 shows the assembled joint with the shafts disposed at a greater angle corresponding to the disposition of a finger joint when the finger is slightly bent. In this position the head 1 is firmly held in the socket 4.

The illustrated device can be implanted into the finger without complete removal of the natural joint. The latter will in great part remain undisturbed but the joint surfaces will be held fractionally apart by the prosthesis. The operation may be conducted very simply by cutting a slot in the proximal half of the joint and inserting the shaft 5 into the medullary canal until the socket 4 is held in the slot. The male component of the joint is similarly located on the distal side of the joint.

For use in the elbow, a device similar to that illustrated above, but on a larger scale, can be used with the female component proximally and the male part distally, but owing to the nature of the joint the shaft of the male component will be angled to allow the correct seating of the cylindrical head in the pre-existing natural socket of the joint, and the female component shaft will be set slightly at an angle to the plane rotation of the device to conform to the natural contours of the joint.

Lastly, while the invention has been more particularly described with reference to what can be regarded as a cylindrical embodiment, the broader aspects of the invention can clearly embrace other forms, such as involving part spherical bearing surfaces in a ball-and-socket embodiment.

I claim:

1. A prosthetic device comprising mutually engageable male and female components to afford pivotal rotation in a plane, the female component including a socket member having a concave bearing surface with a cross section in said plane substantially in the form of a first circular segment subtending an angle greater than 180° and defining an entrance between the ends of said first circular segment, and a first shaft projecting from the rear of said socket member, and the male component including a head member having a convex bearing surface with a cross section in said plane substantially in the form of a second circular segment of equal radius to said first segment, subtending to an angle significantly greater than said first segment, and relieved towards one end contiguously with said second circular segment over a segmental angle at least equal to that by which said first segment exceeds 180° to define a relieved portion, and a second shaft projecting from the rear of said head member, the head member being removably received in the socket member; the width of the head member, in a diametric sense, being greater than the width of said socket mouth, except within said relieved portion where the width of said head member, in a diametric sense at most substantially equal and does not substantially exceed, the width of said socket mouth, whereby when the head member is angularly disposed so that it presents the minimum width of the convex bearing surface thereof afforded by said relieved portion thereof to said socket mouth, said head member may be inserted in and withdrawn from said socket member without substantially deflecting the socket member; the relieved portion being so angularly disposed with respect to said first shaft and said second shaft that once said device is assembled in a patient to provide an articulatable joint, the minimum width of the convex bearing surface cannot be presented to the socket mouth during the normal articulation range of the joint.

2. A device according to claim 1 wherein said socket and head members are of cylindrical form with longitudinal axes perpendicular to said plane.

3. A device according to claim 2 wherein said socket member comprises respective substantially circular end wall members at the longitudinal extremities thereof to embrace said head member when engaged therein.

4. A device according to claim 1, wherein said first segment subtends an angle which exceeds 180° by up to 10°.

5. A device according to claim 1 wherein said second segment subtends an angle which exceeds that of said first segment by about 90°.

6. A device according to claim 1 wherein said first shaft is offset in said plane relative to the central radius of said first segment.

7. A device according to claim 6 wherein said socket member is chamfered towards said concave bearing surface along the leading edge thereof further from said first shaft.

8. A device according to claim 1 wherein said second shaft joins said head member adjacent the relieved surface portion thereof.

9. A device according to claim 1 wherein said shafts are integrally formed with the respective ones of said members.

* * * * *